(12) United States Patent
Kinoshita et al.

(10) Patent No.: US 9,086,848 B2
(45) Date of Patent: Jul. 21, 2015

(54) ELECTRONIC DEVICE HAVING A HINGE UNIT

(71) Applicant: LENOVO (SINGAPORE) PTE. LTD., Singapore (SG)

(72) Inventors: Hiroaki Kinoshita, Kanagawa-ken (JP); Gang Ji, Kanagawa-ken (JP); Hiroyuki Noguchi, Kanagawa-ken (JP); Eiji Shinohara, Kanagawa-ken (JP)

(73) Assignee: LENOVO (SINGAPORE) PTE LTD, Singapore (SG)

( * ) Notice: Subject to any disclaimer, the term of this patent is extended or adjusted under 35 U.S.C. 154(b) by 116 days.

(21) Appl. No.: 13/932,772

(22) Filed: Jul. 1, 2013

(65) Prior Publication Data
US 2014/0009881 A1 Jan. 9, 2014

(30) Foreign Application Priority Data
Jul. 4, 2012 (JP) .................................. 2012-150827

(51) Int. Cl.
*G06F 1/16* (2006.01)

(52) U.S. Cl.
CPC .............. *G06F 1/1637* (2013.01); *G06F 1/162* (2013.01); *G06F 1/1681* (2013.01); *Y10T 16/5472* (2015.01)

(58) Field of Classification Search
CPC ........................................ G06F 1/1616–1/1622
See application file for complete search history.

(56) References Cited

U.S. PATENT DOCUMENTS

| 6,498,721 | B1 | 12/2002 | Kim |
| 7,916,462 | B2 * | 3/2011 | Hung ........................ 361/679.27 |
| 2003/0193773 | A1 * | 10/2003 | Choi .............................. 361/683 |
| 2004/0160733 | A1 * | 8/2004 | Hsu ................................ 361/681 |
| 2007/0285883 | A1 * | 12/2007 | Nakajima et al. .............. 361/683 |
| 2008/0253072 | A1 * | 10/2008 | Tracy et al. .................... 361/681 |
| 2011/0110670 | A1 | 5/2011 | Atkinson |

FOREIGN PATENT DOCUMENTS

| JP | 2003316474 | 11/2003 |
| JP | 2006-277116 | 10/2006 |
| JP | 2009267743 | 11/2009 |
| JP | 2011239200 | 11/2011 |

\* cited by examiner

*Primary Examiner* — Anthony Q Edwards
(74) *Attorney, Agent, or Firm* — Antony P. Ng; Russell Ng PLLC (57) ABSTRACT

A laptop personal computer (PC) is disclosed. The laptop PC includes a hinge unit that turns around a vertical axis and rotates around a horizontal axis, and the hinge unit connects a main body chassis to a display chassis. The hinge unit includes an inside, through which cables connecting a main body and a display pass. A path is provided, along which the cables are installed, and the path includes a part that is parallel to the vertical axis and is apart from the vertical axis and having a part overlapping with the horizontal axis towards the vertical axis. The cover is provided at the display chassis for covering the cables overlapping with the horizontal axis. This can eliminate the necessity of a cover for the cables on the side of the hinge unit, thus making the laptop PC thinner.

4 Claims, 11 Drawing Sheets

ELECTRONIC DEVICE HAVING A HINGE UNIT

PRIORITY CLAIM

The present application claims benefit of priority under 35 U.S.C. §§120, 365 to the previously filed Japanese Patent Application No. JP2012-150827 with a priority date of Jul. 4, 2012, which is incorporated by reference herein.

BACKGROUND OF THE INVENTION

1. Technical Field

The present invention relates to electronic devices in general, and more particularly to an electronic device having a rotating hinge unit for connecting a display chassis to a main body chassis.

2. Description of Related Art

Some electronic devices, such as laptop personal computers (PCs), include a hinge unit configured to couple a main body chassis to a display chassis. The hinge unit is capable of being turned around a vertical axis and being rotated around a horizontal axis.

SUMMARY OF THE INVENTION

In accordance with a preferred embodiment of the present invention, an electronic device includes a hinge unit having a vertical axis and a horizontal axis, and the hinge unit is capable of turning around the vertical axis and rotates around the horizontal axis. Connecting a main body chassis to a display chassis, the hinge unit includes a hollow body through which various cables connecting a main body and a display pass. The hinge unit includes a path along which the cables are installed, the path having a part that is parallel to the vertical axis and is apart from the vertical axis and a part overlapping with the horizontal axis towards the vertical axis. A cover is provided at the display chassis for covering the cables overlapping with the horizontal axis.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The following describes one embodiment of an electronic device according to the present invention in detail with reference to the drawings. Although a laptop personal computer (PC) is used as an example for the description, the present invention is not limited to laptop PCs and is applicable to electronic devices such as mobile phones and Personal Digital Assistants.

Figure 12:
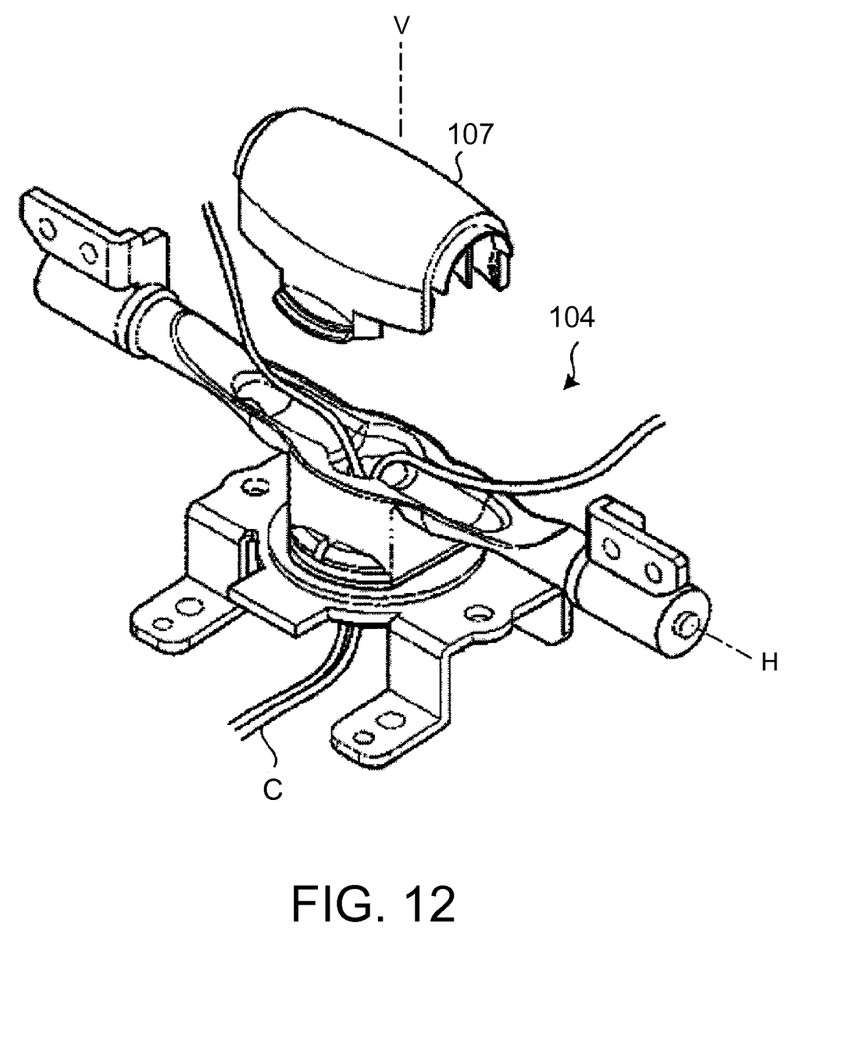
FIG. 12 is a perspective view of a hinge unit.

As illustrated in FIG. 12, an electronic device, such as a laptop PC, includes a hinge unit 104 turning around a vertical axis V and rotating around a horizontal axis H, and the hinge unit 104 is configured to couple a main body chassis to a display chassis. The electronic device also includes a cable C connecting a main body and a display, the cable C being installed inside the hinge unit 104. Specifically, the cable C is installed along a path overlapping with the vertical axis V and along the horizontal axis H. The cable C installed at the path overlapping with the vertical axis V is covered with a hinge cap 107 attached to the hinge unit 104.

FIGS. 1 to 5 are perspective views of a laptop PC. As illustrated in FIGS. 1 to 5, a laptop PC 1 is a convertible laptop PC. That is, the laptop PC 1 can be used while opening a display 3 with respect to a main body 2 (see FIG. 1) and can be carried while closing the display 3 with respect to the main body 2 (see FIGS. 2 and 3), and the laptop PC 1 can be used as a tablet PC as well by rotating the display 3 180 degrees for folding (see FIG. 5). The laptop PC 1 includes the main body 2, the display 3 and a hinge unit 4 coupling them.

Figure 1:
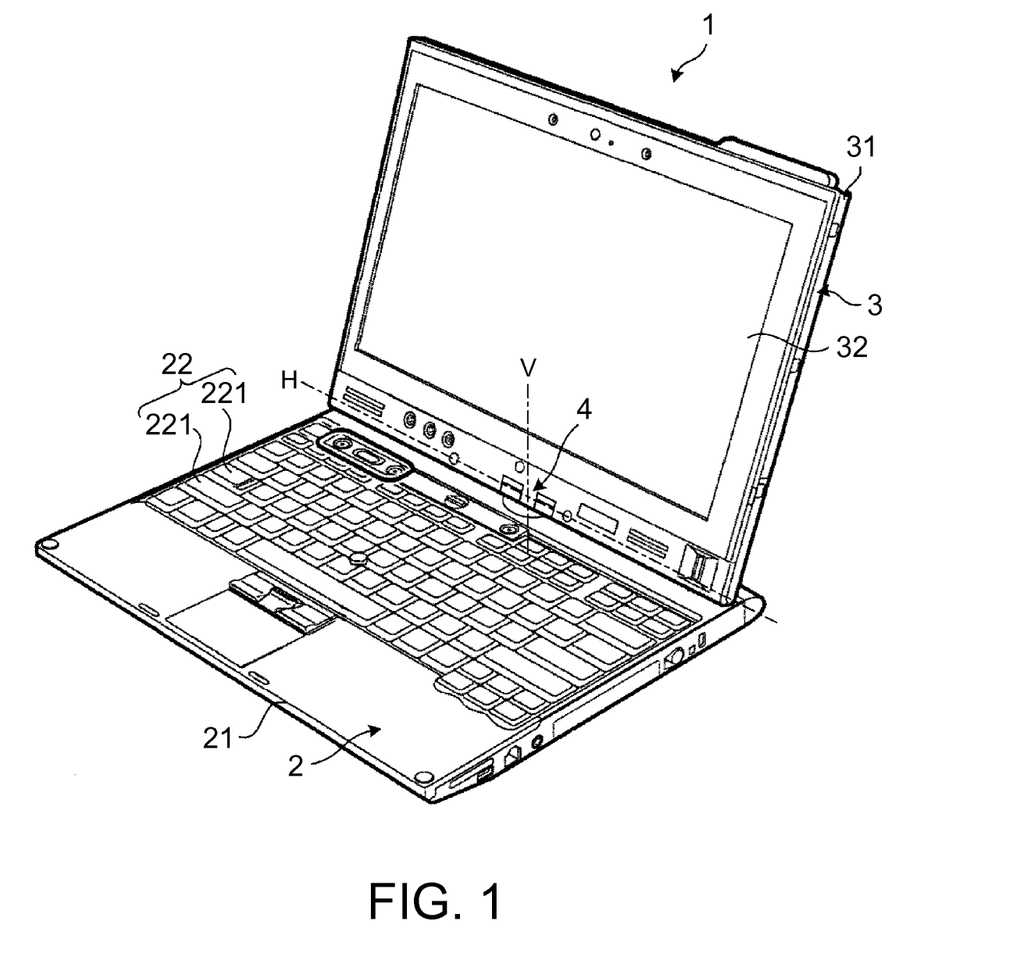
FIG. 1 is a perspective view of a laptop personal computer (PC) having a display being opened.

As illustrated in FIG. 1, the main body 2 is made up of a main body chassis 21 in a thin rectangular box form in a plan view, accommodating components configuring a computer such as a CPU, a memory device, a hard disk, and a power supply unit. The main body chassis 21 has a top face 21, on which a keyboard 22 as an input device is provided, the keyboard 22 including multiple key tops 221 with letters and signs printed thereon. Pressing a key top 221 means inputting of a signal corresponding to the key top 221 to the CPU.

Figure 2:
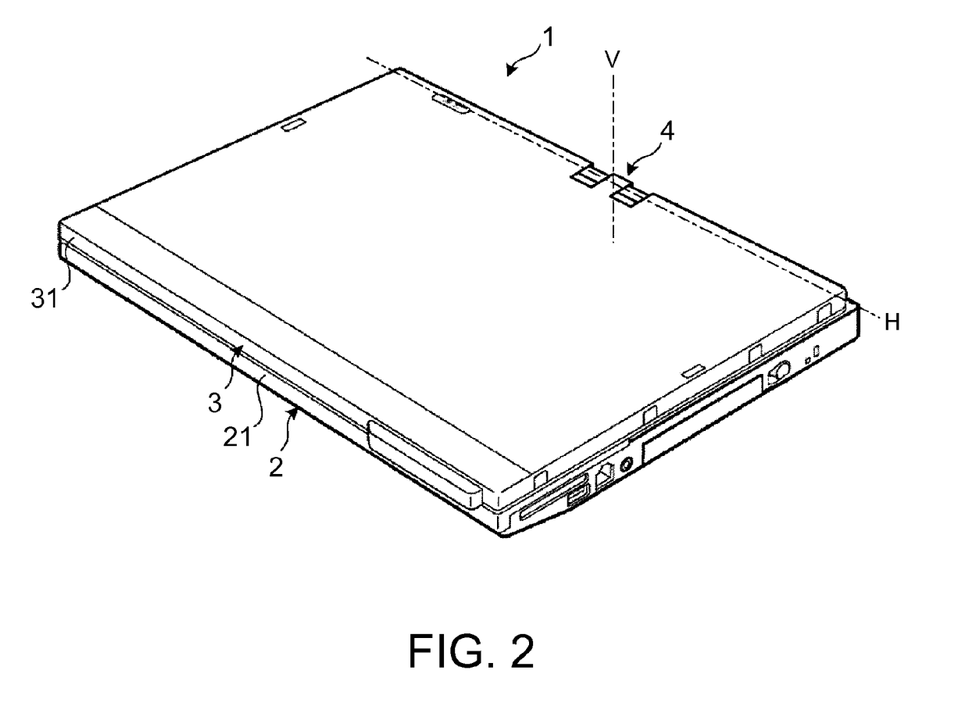
FIG. 2 is a perspective view of the laptop PC from FIG. 1 having the display being closed.
Figure 3:
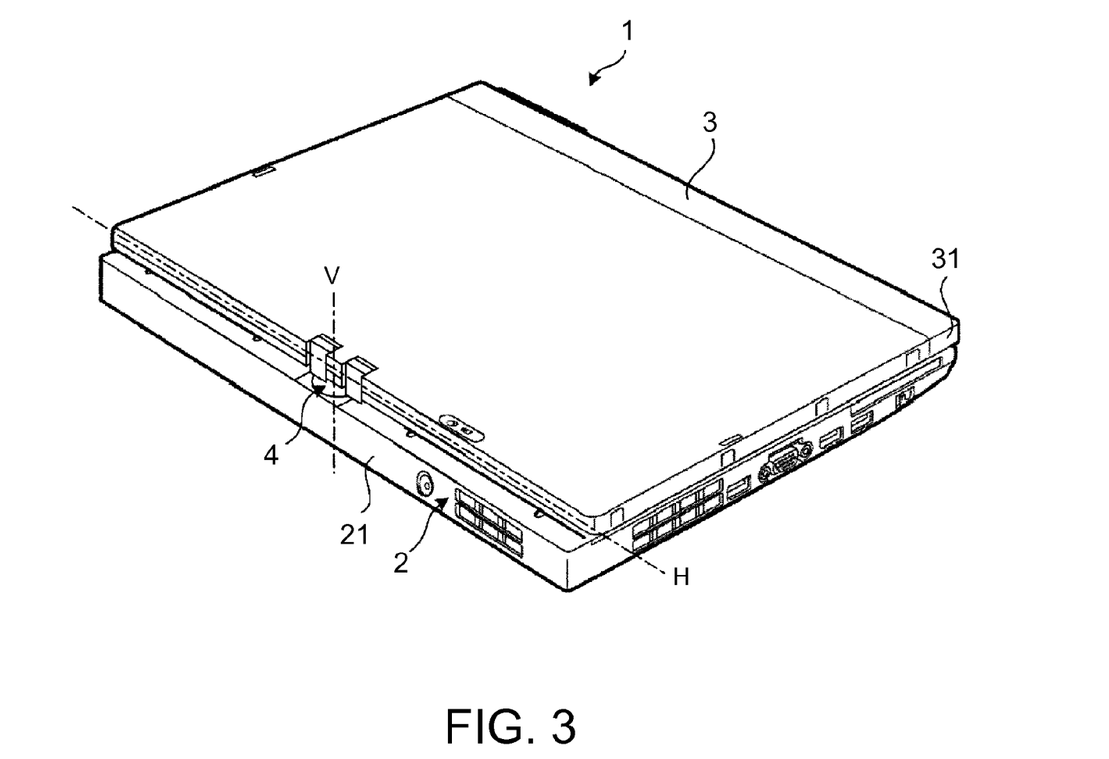
FIG. 3 shows the rear side of the laptop PC from FIG. 1.

As illustrated in FIG. 2, the display 3 is made up of a display chassis 31 in a thin rectangular box form in a plan view, accommodating components such as a display 32, communication means such as an antenna, and input means such as a touch panel, the display 32 displaying and outputting various types of information.

Figure 4:
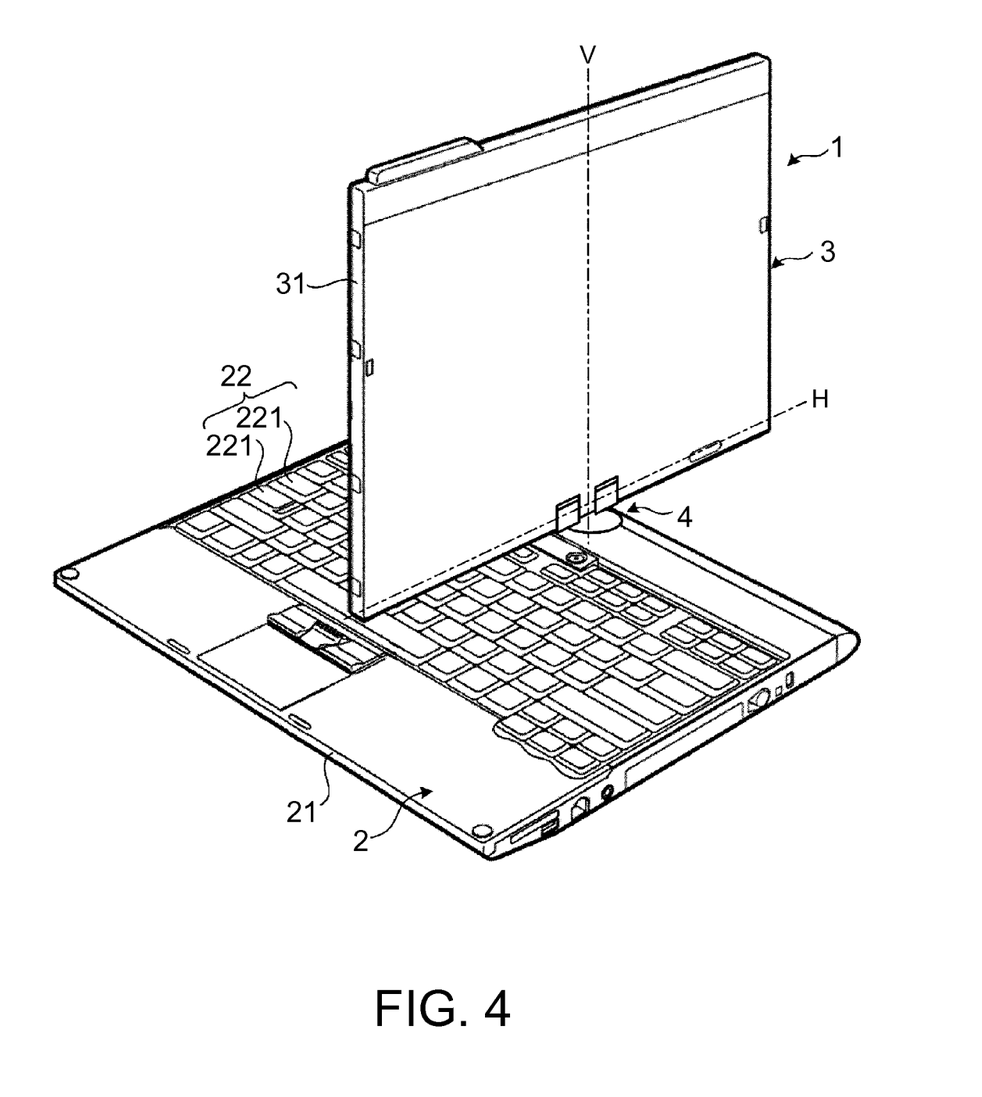
FIG. 4 shows the state of the laptop PC from FIG. 1 where the display is rotating around the vertical axis.
Figure 5:
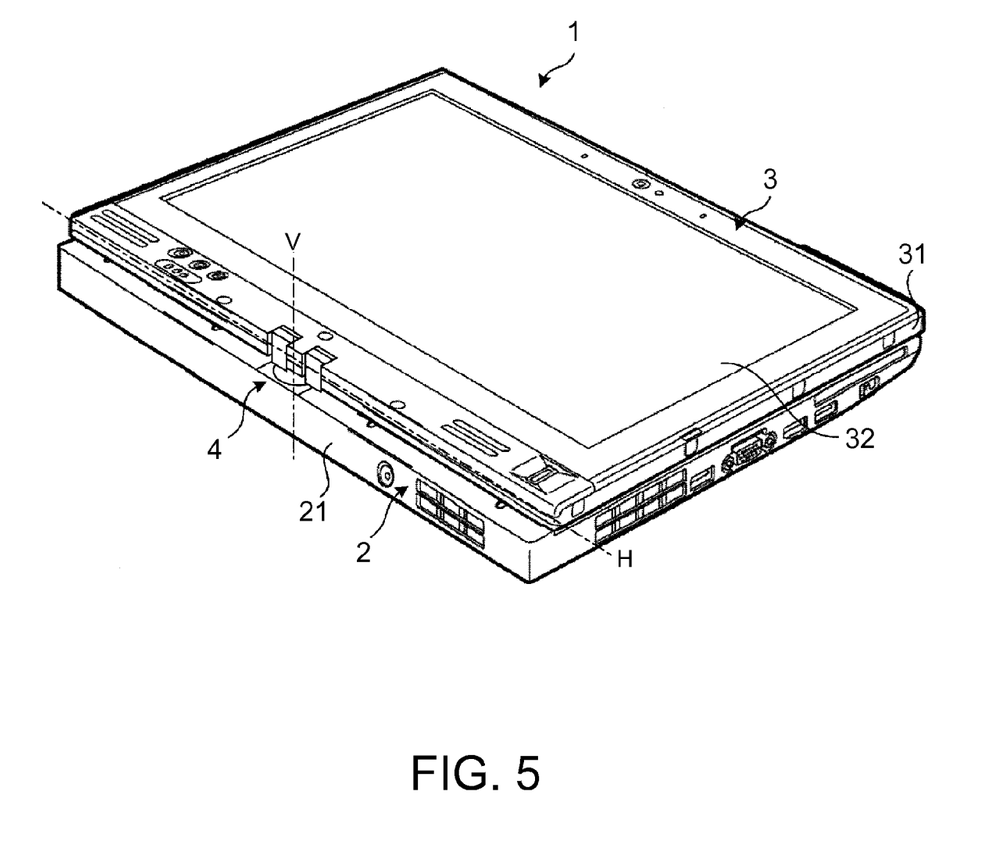
FIG. 5 is a perspective view of the laptop PC from FIG. 1 where the display thereof is rotated 180 degrees and is folded.

The hinge unit 4 is provided between the main body chassis 21 and the display chassis 31 and couples the main body 2 (within the main body chassis 21) and the display 3 (within the display chassis 31). The hinge unit 4 is rotatable around two axes of a vertical axis V and a horizontal axis H, and as illustrated in FIG. 4, the display 3 rotates around the vertical axis V while coupling the main body 2 and the display 3, and as illustrated in FIGS. 1 and 2, the display 3 rotates around the horizontal axis H while coupling the main body 2 and the display 3.

Figure 6:
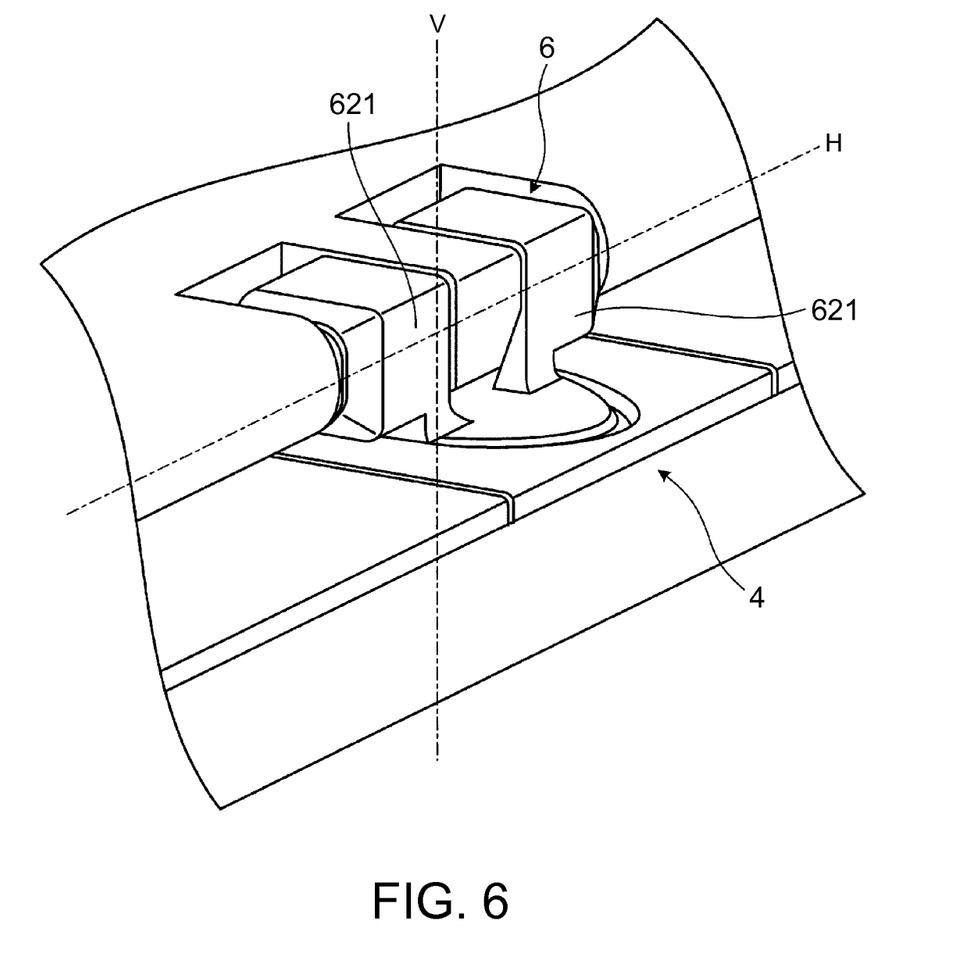
FIG. 6 is an enlarged view of a hinge unit of the laptop PC from FIG. 1.
Figure 7:
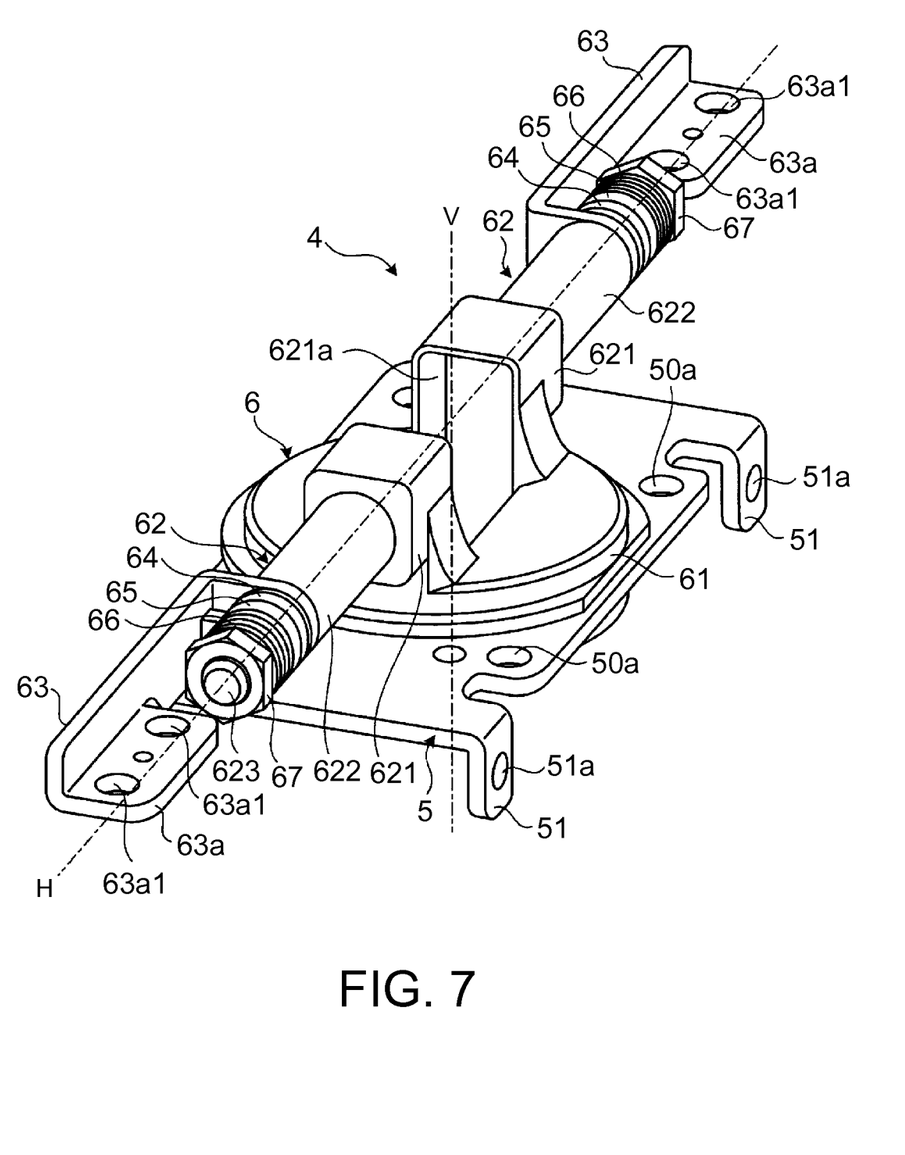
FIG. 7 is a perspective view of the hinge unit from FIG. 6.
Figure 8:
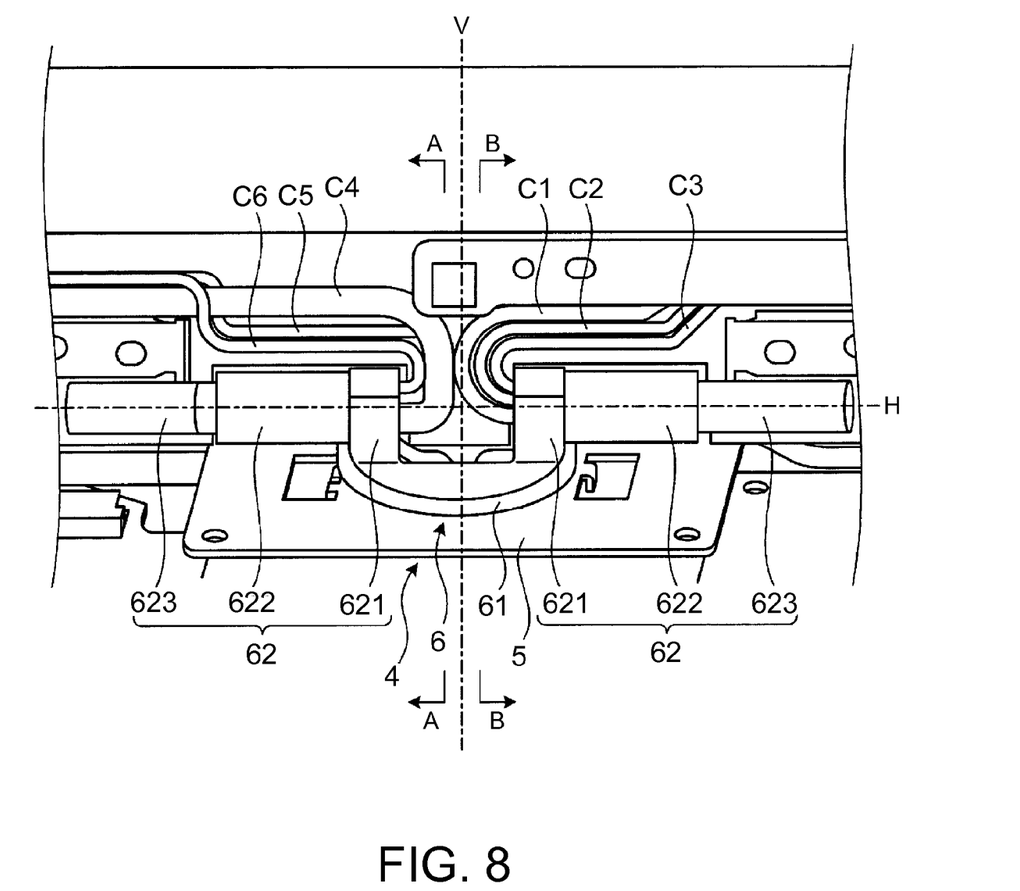
FIG. 8 shows a relationship between the hinge unit and cables.
Figure 9:
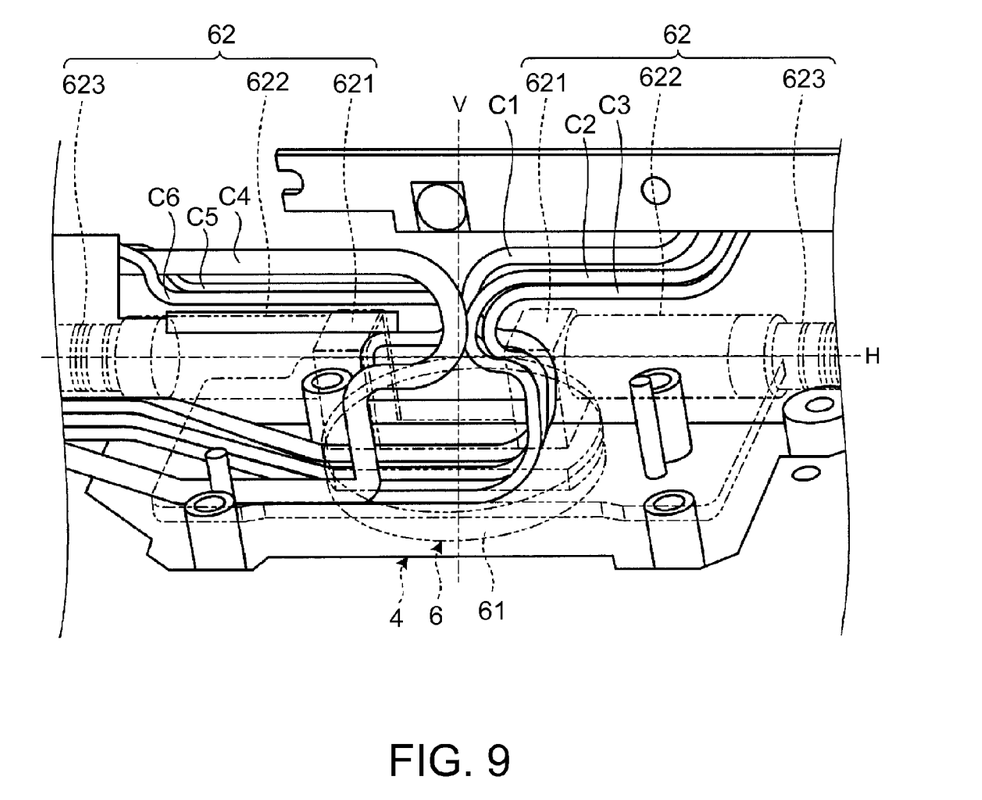
FIG. 9 shows a path where the cables from FIG. 8 are installed.
Figure 10:
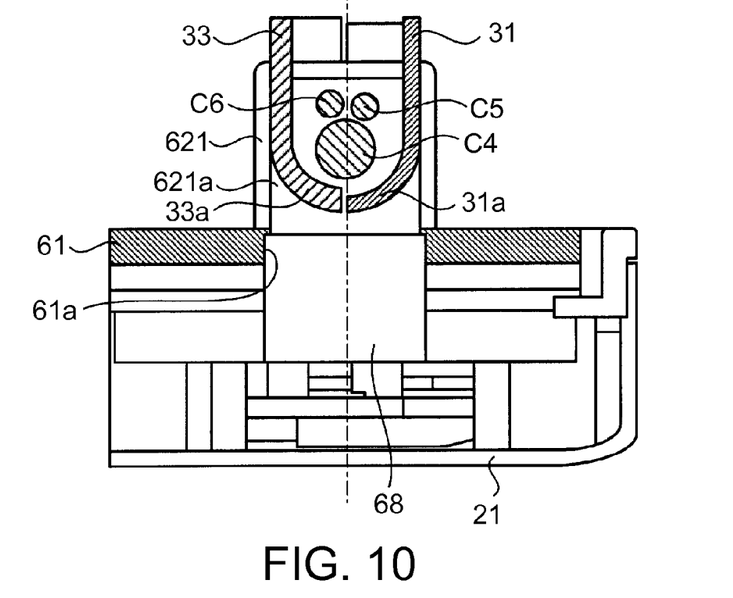
FIG. 10 is a cross-sectional view taken along the line A-A of FIG. 8.
Figure 11:
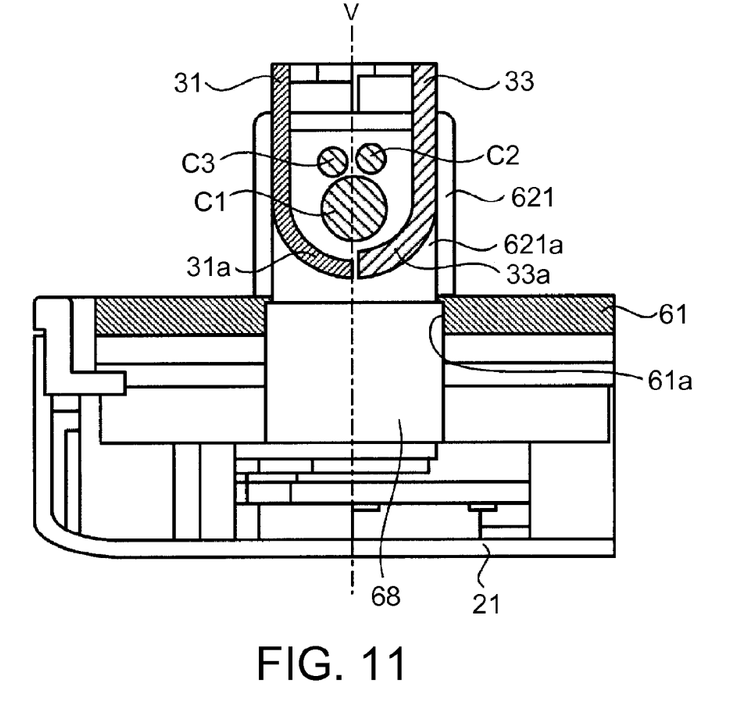
FIG. 11 is a cross-sectional view taken along the line B-B of FIG. 8.

FIG. 6 is an enlarged view of the hinge unit illustrated in FIG. 3, and FIG. 7 is a perspective view of the hinge unit illustrated in FIG. 6. FIG. 8 is a perspective view showing a relationship between the hinge unit and cables, and FIG. 9 shows a path where the cables illustrated in FIG. 8 are installed. FIG. 10 is a cross-sectional view taken along the line A-A of FIG. 8, and FIG. 11 is a cross-sectional view taken along the line B-B of FIG. 8.

As illustrated in FIG. 7, the hinge unit 4 includes a base plate 5 and a rotating body 6. The base plate 5 is a base of the hinge unit 4, and is attached to the main body chassis 21. The base plate 5 is made up of a plate member in a substantially rectangular form in a plan view having a pair of rear-edge side protrusions 51 folded downward, which are shown on the right side of FIG. 7. The base plate 5 is provided with several mounting holes 50a vertically penetrating therethrough and a mounting hole 51a penetrating each of the rear-edge side protrusions in the front-to-rear direction, and the base plate 5 is attached to the main body chassis 21 via screws (not illustrated) inserted into these mounting holes 50a and 51a. The base plate 5 is further provided with a through hole (not illustrated) vertically penetrating therethrough at a substantially center position. This through hole is to rotatably mount the rotating body 6 and has a circular form in a plan view.

The rotating body 6 rotates around the vertical axis V in the hinge unit 4, and includes a barrel 61 and a pair of arms 62. The barrel 61 has a cylindrical form to be inserted into the above-mentioned through hole, and the rotating body 6 is rotatably attached to the through hole by inserting the barrel 61 into the through hole. Thereby, the rotating body 6 can turn around the vertical axis V passing through the center of the through hole.

The pair of arms 62 is provided on the barrel 61 along the horizontal axis H intersecting the above-mentioned vertical axis V. Each arm 62 includes a base 621, a large-diameter part 622 and a shaft 623. The base 621 has a rectangular parallelepiped form having a center on the aforementioned horizontal axis H. The large-diameter part 622 and the shaft 623 have a cylindrical form similarly having a center on the aforementioned horizontal axis H. The shaft 623 has a perfect circle form in a cross-sectional view on the side of the large-diameter (proximal end) 622, and this part of the shaft 623 is fitted into a stay 63 and a rotary cam 64 so that the stay 63 and the rotary cam 64 integrally rotate. The shaft 623 has a pair of flat faces on the front end side, and has a cross-section in an irregular form of a perfect circle, from which both side portions of the prefect circle are removed. This part of the shaft is fitted into a fixing cam 65 and multiple disk springs 66, the fixing cam 65 being fixed in the circumferential direction of the shaft 623.

The shaft 623 is provided with external threads (not illustrated) on the front end side. The external threads are screwed together with internal threads (not illustrated) provided at a nut 67, and thus the aforementioned stay 63, rotary cam 64, fixing cam 65 and plurality of disk springs 66 are attached.

The aforementioned stay 63, to which the display chassis 31 is to be attached, is formed by folding a plate member. The stay 63 extends from a shaft hole (not illustrated), to which the shaft 623 is to be inserted, outwardly in the direction of the diameter of the shaft hole, and then is folded 90 degrees so as to extend to the outside of the display chassis 31. The stay 63 is further folded 90 degrees at the front-end side so as to define an attachment part 63a. This attachment part 63a is provided with a through hole 63a1 so as to overlap with a screw hole (not illustrated) provided at the display chassis 31, and so screwing-in of a machine screw (not illustrated) inserted through the through hole 63a1 into the screw hole means the stay 63 to be attached to the display chassis 31.

The rotary cam 64 and the fixing cam 65 generate desired opening/closing load (torque) between the main body 2 and the display 3, and this opening/closing load maintains a closing state of the display 3 with respect to the main body 2, and holds the display 3 opened at any position with respect to the main body 2.

The barrel 61 of the rotating body 6 is provided with a hole 61a overlapping with the aforementioned vertical axis V, and the base 621 making up the arm 62 of the rotating body 6 is provided with a concave 621a communicating with the hole 61a and overlapping with the aforementioned horizontal axis H. The hole 61a has an oval shape in cross section, appearing as a rectangular form in a plan view and as an oval form in a bottom plan view. The hole 61a and the concave 621a form a path where cables C1 to C6 connecting the main body 2 and the display 3 are to be installed. For instance, when six cables (C1 to C6) are to be installed, some of them (e.g., C1 to C3) may pass through one end side of the hole 61a and one concave 621a, and the remaining cables (e.g., C4 to C6) may pass through the other end of the hole 61a and the other concave 621a.

With this configuration, the cables C1 to C6 pass through a path that is parallel to the aforementioned vertical axis V and apart from the vertical axis V and then through a path toward the vertical axis V and overlapping with the aforementioned horizontal axis H. Although that is the description of installing the cables from the main body 2 to the display 3 for convenience in explanation, the cables may be installed from the display 3 to the main body 2.

Then, a rubber bush 68 is fitted at a part of the center of the hole 61a, thus limiting the cables C1 to C6 so as to pass through a position apart from the center (vertical axis) of the hole while improving water resistance and dust resistance of the main body 2. Such a bush fitted further improves the appearance because the cables C1 to C6 passing internally of the hinge becomes invisible from the outside.

In the described laptop PC 1 that is one embodiment of the present invention, a cover covering the cables C1 to C6 can traverse the vertical axis, and so covers 31a and 33a can be provided to the display chassis 31 and a bezel 33 overlapping with the display chassis 31 as illustrated in FIGS. 10 and 11. This can eliminate the necessity of a cover on the side of the hinge unit 4, thus making the laptop PC 1 thinner.

As has been described, the present disclosure provides a laptop PC having a rotating hinge unit for connecting a display chassis to a main body chassis.

While the disclosure has been particularly shown and described with reference to a preferred embodiment, it will be understood by those skilled in the art that various changes in form and detail may be made therein without departing from the spirit and scope of the disclosure.

What is claimed is:

1. An electronic device comprising:
    a main body chassis for containing a main body;
    a display chassis for containing a display;
    a hinge unit for connecting said main body chassis to said display chassis, wherein said hinge unit is capable of being rotated around a vertical axis and being flipped around a horizontal axis, wherein said hinge unit includes
        a base plate having a plurality of mounting means configured to attach to said main body chassis;
        a rotating body includes a barrel and a pair of arms, wherein said barrel is capable of being rotated around said vertical axis on said base plate, wherein said pair of arms is provided on said barrel along a horizontal axis intersecting said vertical axis, wherein said pair of arms is configured to attached to said display chassis to allow said display chassis to turn around said horizontal axis, wherein said rotating body has a hollow body through which a plurality of cables connecting said main body and said display passes, wherein a path along which said cable is installed includes a part that is parallel to said vertical axis and is apart from said vertical axis and a part overlapping said horizontal axis towards said vertical axis, wherein rotating body includes a rubber bush to provide water resistance and dust resistance to said main body, and a hinge cover traversing said vertical axis of said hinge unit to allow said electronic device to be thinner; and
a cover provided at said display chassis for covering said cable overlapping said horizontal axis.

2. The electronic device of claim 1, wherein said hinge unit includes a rotating body capable of being rotated around said vertical axis, wherein said rotating body includes a barrel and an arm.

3. The electronic device of claim 2, wherein said barrel includes a hole overlapping said vertical axis and said arm overlapping said horizontal axis and having a base, wherein said base includes a concave communicating with said hole.

4. The electronic device of claim 3, wherein said hinge unit further includes a bush fitted into said hole to occupy said hole.

\* \* \* \* \*